US012744148B2

(12) United States Patent
Liao et al.

(10) Patent No.: US 12,744,148 B2
(45) Date of Patent: Sep. 22, 2026

(54) TRANSFORMER DEVICE AND PLASMA GENERATING APPARATUS CONTAINING THE SAME

(71) Applicant: NATIONAL CHENG KUNG UNIVERSITY, Tainan City (TW)

(72) Inventors: Jiunn-Der Liao, Tainan City (TW); Ming-Hsien Cheng, Tainan City (TW)

(73) Assignee: NATIONAL CHENG KUNG UNIVERSITY, Tainan City (TW)

( * ) Notice: Subject to any disclaimer, the term of this patent is extended or adjusted under 35 U.S.C. 154(b) by 358 days.

(21) Appl. No.: 18/624,205

(22) Filed: Apr. 2, 2024

(65) Prior Publication Data

US 2025/0210242 A1 Jun. 26, 2025

(30) Foreign Application Priority Data

Dec. 22, 2023 (TW) ................................ 112150385

(51) Int. Cl.

*H01F 27/06* (2006.01)
*H01F 27/28* (2006.01)
*H05H 1/46* (2006.01)

(52) U.S. Cl.

CPC ............. *H01F 27/06* (2013.01); *H01F 27/28* (2013.01); *H05H 1/4652* (2021.05)

(58) Field of Classification Search

CPC ........ H01F 27/06; H01F 27/28; H05H 1/4652
USPC .................................................... 156/345.49
See application file for complete search history.

(56) References Cited

U.S. PATENT DOCUMENTS

2013/0199540 A1* 8/2013 Buske .................. A61B 18/042 128/845
2018/0359842 A1 12/2018 Buske et al.
2024/0015879 A1* 1/2024 Chang .................... H05H 1/466

FOREIGN PATENT DOCUMENTS

CN 109889003 A * 6/2019

* cited by examiner

*Primary Examiner* — Charlee J. C. Bennett
(74) *Attorney, Agent, or Firm* — BACON & THOMAS, PLLC

(57) ABSTRACT

A transformer device comprises: a magnetic element; a first induction coil assembled on the magnetic element; a second induction coil corresponding to the first induction coil, wherein the second induction coil and the first induction coil have the same axis but have no physical contact; a fixing element comprising a first winding base and a motor stator, wherein the magnetic element and the first induction coil are assembled on the first winding base and combined with the motor stator with a first locking element; and a rotating element comprising a second winding base and a motor rotor, wherein the second induction coil is assembled on the second winding base and combined with the motor rotor with a second locking element. Moreover, the above-mentioned transformer device is connected to a plasma generating device to obtain a plasma generating apparatus, and a circular large-area plasma coverage is achieved after rotating.

10 Claims, 6 Drawing Sheets

A-A'

B-B'

B-B'

TRANSFORMER DEVICE AND PLASMA GENERATING APPARATUS CONTAINING THE SAME

CROSS-REFERENCE TO RELATED APPLICATIONS

This application claims the benefits of the Taiwan Patent Application Serial Number 112150385, filed on Dec. 22, 2023, the subject matter of which is incorporated herein by reference.

BACKGROUND OF THE INVENTION

Field

The present invention relates to a transformer device and a plasma generating apparatus containing the same. More specifically, the present invention relates to a transformer device suitable for a plasma generating apparatus that generates rotating large-area plasma and a plasma generating apparatus containing the same.

Description of Related Art

The conventional plasma generating apparatus uses a conductive slip ring driven by a motor to transmit the alternating current supplied by the plasma power supply to the first induction coil of the transformer device to increase the voltage. The high voltage generated at both ends of the second induction coil of the transformer device is supplied to the two electrodes of the large-area plasma nozzle, forming a high-voltage electric field that dissociates the gas flowing through the nozzle into a plasma state.

US2018/0359842A1 published on Dec. 13, 2018 discloses a device for generating an atmospheric plasma beam, in which a conductive slip ring is used to transmit electrical energy to rotating electrodes. In particular, the conductive slip ring is used to transmit high voltage to the rotating electrodes to generate high-temperature and normal-pressure plasma. A high-voltage electric field is supplied by an external high-voltage power supply. In addition to impedance matching, the external high-voltage power supply will also be used with the above-mentioned transformer device to increase the voltage. The first induction coil and the second induction coil are both wound on a transformer core with high magnetic permeability. The energy is transferred through the coupled magnetic field. The electrical energy is converted into magnetic flux through the first induction coil. As the magnetic field lines of the transformer core cuts through the second induction coil, the magnetic energy is converted into electrical energy again, and then the energy is transferred to the second induction coil. Utilizing the characteristic that the voltage on the coil is proportional to the amount of turns, the amount of turns of the second induction coil is increased to increase the voltage to dissociate the gas into a plasma state.

However, the above-mentioned conductive slip ring needs to rotate along the central axis, so its structure will block the middle region. The generation of plasma requires the application of clean gas or inert gas, so the existence of the conductive slip ring will occupy the path of the introduced gas and block the gas flow. In addition, the conductive slip ring has physical contact points, which will generate friction when rotating, so the rotation speed is limited, and low-speed rotation will make the plasma in the plasma coverage area uneven. Therefore, there is a defect that the weight, volume and complexity of the plasma generating apparatus are increased, and the rotation speed cannot be increased.

For this reason, the inventor, in the spirit of active invention, is desirable to propose an improved transformer device and a plasma generating apparatus containing the same. In particular, the inventor is desirable to propose a device that is low-cost, has low friction and rotate at high speed, a method that can transmit high-voltage electric energy to the electrodes of plasma generating device, and an apparatus that the flow of gas is not blocked, to eliminate or alleviate the above problems.

SUMMARY OF THE INVENTION

The object of the present invention is to provide a transformer device and a plasma generating apparatus containing the same, wherein the plasma power is directly supplied to the transformer device, the first induction coil is assembled on the fixing element (wound around the first winding base and connected to the motor stator), and the second induction coil is not assembled on the magnetic element but is linked to the rotating element connected to the motor (wound around the second winding base and connected to the motor rotor). When the second induction coil is rotating, the voltage of the electrical energy can be increased, the energy can be transferred to the electrodes of the rotating plasma generating device to generate a high-voltage electric field. In addition, by designing the magnetic element into a hollow cylindrical shape, the flow of gas cannot be blocked. The flowing gas can not only take away the waste heat generated on the magnetic element, but also flow to the plasma generating device, so that the gas flowing through the large-area plasma nozzle between the first electrode and the second electrode is excited and dissociated into a plasma state.

In view of this, according to one aspect of the present invention, a transformer device is provided, which comprises: a magnetic element, a first induction coil, a second induction coil, a fixing element and a rotating element. Herein, the first induction coil is assembled on the magnetic element; the second induction coil is corresponding to the first induction coil, wherein the second induction coil and the first induction coil have the same axis but have no physical contact; the fixing element comprises a first winding base and a motor stator, and the magnetic element and the first induction coil are assembled on the first winding base and combined with the motor stator with a first locking element; and the rotating element comprises a second winding base and a motor rotor, and the second induction coil is assembled on the second winding base and combined with the motor rotor with a second locking element. In the present invention, the first locking element and the second locking element may respectively be a screw, but the present invention is not limited thereto.

In the present invention, the shape of the magnetic element may be hollow cylinder, hollow square cylinder, hollow triangular cylinder or any hollow shape, but the present invention is not limited thereto. In the present invention, the material of the magnetic element may include iron oxide, manganese, zinc, nickel, magnesium, copper, an alloy thereof or a combination thereof, but the present invention is not limited thereto. In the present invention, the magnetic element has a central axis, a hollow portion of the magnetic element passes through the central axis, and a maximum length of the hollow portion perpendicular to the central axis (for example, which can be the inside diameter of the hollow portion of the hollow cylinder when the shape of the magnetic element is hollow cylinder) may range from 0.3 cm to 1 cm, for example, from 0.3 cm to 0.8 cm, 0.5 cm to 0.8 cm, or about 0.7 cm. In addition, the magnetic element passes through the central axis, and a maximum length of the magnetic element perpendicular to the central axis (for example, which can be the outside diameter of the hollow cylinder when the shape of the magnetic element is hollow cylinder) may range from 0.5 cm to 2 cm, for example, 0.5 cm to 1.5 cm, 0.8 cm to 1.5 cm, or about 1.2 cm, but the present invention is not limited thereto.

In the present invention, an amount of turns of the first induction coil may be less than an amount of turns of the second induction coil. The amount of turns of the first induction coil may range from 5 to 50, for example, 5 to 40, 10 to 40, or 20 to 40, or about 24. The amount of turns of the second induction coil may range from 200 to 600, for example, 200 to 500, 300 to 500, or about 400. However, the present invention is not limited thereto.

In the present invention, the materials of the first induction coil and the second induction coil may respectively be Cu, Ag, Al, an alloy thereof or a combination thereof, but the present invention is not limited thereto.

In the present invention, a gap between the first induction coil and the second induction coil has a distance which may range from 0.1 cm to 15 cm, for example, 0.1 cm to 12 cm, 0.1 cm to 10 cm, 0.1 cm to 5 cm, 0.5 cm to 5 cm, or about 0.7 cm, but the present invention is not limited thereto. Herein, the distance of the gap between the first induction coil and the second induction coil is measured in a direction perpendicular to the axis of the first induction coil and/or the second induction coil. The lower limit of the distance (i.e. the minimum distance) of the gap between the first induction coil and the second induction coil is designed that there has to be a certain interval between the first induction coil and the second induction coil so that they do not collide with each other when rotating. The upper limit of the distance (i.e. the maximum distance) of the gap between the first induction coil and the second induction coil is designed based on Faraday's first law as represented by the following equation 1, and does not exceed the distance that the magnetic field lines can cut the second induction coil:

$$\varepsilon = -N\frac{d\Phi_B}{dt} \qquad \text{Equation 1}$$

wherein, $\varepsilon$ is electromotive force, N is the amount of turns, and $d\Phi_B/dt$ is change in magnetic flux per unit time.

In the present invention, the first induction coil may be wound on the first winding base, the second induction coil may be wound on the second winding base, the first winding base may be assembled on the magnetic element, and the second winding base may correspond to the first winding base, wherein the second winding base and the first winding base may have the same axis but have no physical contact; but the present invention is not limited thereto. In the present invention, an inside diameter of the first winding base may range from 0.8 cm to 1.5 cm, for example, 1 cm to 1.25 cm, or about 1.2 cm; and the outer diameter of the first winding base may range from 1.5 cm to 2.5 cm, for example, 1.5 cm to 2 cm, or about 1.8 cm. The inside diameter of the second winding base may range from 2 cm to 3 cm, for example, 2.5 cm to 3 cm, or about 2.6 cm; and the outer diameter of the second winding base may range from 2.5 cm to 4 cm, for example, 2.75 cm to 3.5 cm, or about 3 cm. However, the present invention is not limited thereto.

In the present invention, the rotating element may connect to a motor, and the rotating element may rotate around a central axis; but the present invention is not limited thereto.

According to another aspect of the present invention, a plasma generating apparatus is provided, which comprises the aforementioned transformer device and a plasma generating device. The plasma generating device connects the transformer device and comprises a first electrode, a second electrode and a dielectric element, and the dielectric element is disposed between the first electrode and the second electrode.

In the present invention, the materials of the first electrode and the second electrode may respectively comprise Cu, Ag, Pd, or a transparent conductive oxide such as InO, SnO, ZnO or ITO, but the present invention is not limited thereto.

In the present invention, the material of the dielectric element may be Teflon, glass, quartz, or ceramic, but the present invention is not limited thereto.

In the present invention, the second induction coil may electrically connect to the first electrode and the second electrode of the plasma generating device. More specifically, the second induction coil may electrically connect to the first electrode and the second electrode of the plasma generating device through a first connector and a second connector respectively, but the present invention is not limited thereto.

In the present invention, the magnetic element may have a first channel (i.e. the hollow portion of the magnetic element), the dielectric element may have a second channel, and the first channel may correspond to the second channel; but the present invention is not limited thereto.

In the present invention, the first channel may have a first inlet, the second channel may have a second outlet, and a gas may be introduced from the first inlet and plasma is generated at the second outlet; but the present invention is not limited thereto.

In the present invention, the second outlet may have a strip shape, but the present invention is not limited thereto. In the present invention, a length of the second outlet may range from 2 cm to 15 cm, for example, 2 cm to 12 cm, 2 cm to 10 cm, 2 cm to 8 cm, 5 cm to 8 cm, or about 5 cm, but the present invention is not limited thereto.

Through the above design, the present invention can provide a smooth hollow flow channel for the gas to be dissociated into plasma (i.e. the first channel of the magnetic element and the second channel of the dielectric element). The rotation speed of the plasma generating device is not limited by the traditional conductive slip ring. Increasing the rotation speed can make the ejected plasma beam more evenly distributed in the rotating coverage area. In addition, the weight of the plasma generating apparatus can also be reduced by not using the conductive slip ring. Since the second induction coil has been separated from the magnetic element, the second induction coil is assembled on the rotating element (the second induction coil is wound around the second winding base and combined with the motor rotor with a second locking element), and the first induction coil and the magnetic element are assembled on the fixing element (the first induction coil is wound around the first winding base and the first induction coil and the magnetic element are combined with the motor stator with first locking element). Thus, the second induction coil can rotate and apply high-voltage energy to the plasma generating device, while the magnetic element and the first induction coil do not need to participate in the rotation, and the energy can be transmitted to the second induction coil through the first induction coil.

Since there is no physical contact between the plasma power source and the first electrode and the second electrode of the plasma generating device during rotation, the rotation speed can be much higher than that of conventional devices using mechanical rotating contacts. The loss caused by rotational friction can be reduced, the service life of the apparatus can be increased, and the assembly of the plasma generating apparatus can be simplified and the cost thereof can be reduced.

Other objects, advantages, and novel features of the present invention will become more apparent from the following detailed description when taken in conjunction with the accompanying drawings.

DETAILED DESCRIPTION OF THE INVENTION

Different embodiments of the present invention are provided in the following description. These embodiments are meant to explain the technical content of the present invention, but not meant to limit the scope of the present invention. A feature described in an embodiment may be applied to other embodiments by suitable modification, substitution, combination, or separation.

It should be noted that, in the present specification, when a component is described to have an element, it means that the component may have one or more of the elements, and it does not mean that the component has only one of the element, except otherwise specified.

Moreover, in the present specification, the ordinal numbers, such as “first” or “second”, are used to distinguish a plurality of elements having the same name, and it does not mean that there is essentially a level, a rank, an executing order, or a manufacturing order among the elements, except otherwise specified. A “first” element and a “second” element may exist together in the same component, or alternatively, they may exist in different components, respectively. The existence of an element described by a greater ordinal number does not essentially mean the existent of another element described by a smaller ordinal number.

In the present specification, unless otherwise specified, the so-called feature A “or” feature B means that A exists alone, or B exists alone; the so-called feature A “and” feature B means that A and B exist at the same time; the so-called “include”, “comprise”, “have”, and “contain” means including but not limited to this.

Moreover, in the present specification, the terms, such as “top”, “bottom”, or “middle”, as well as the terms, such as “on”, “above”, “under”, “below”, or “between”, are used to describe the relative positions among a plurality of elements, and the described relative positions may be interpreted to include their translation, rotation, or reflection.

Moreover, in the present specification, when an element is described to be arranged “on” another element, it does not essentially mean that the elements contact the other element, except otherwise specified.

Moreover, in the present specification, a value may be interpreted to cover a range within ±10% of the value, and in particular, a range within ±5% of the value, except otherwise specified; a range may be interpreted to be composed of a plurality of subranges defined by a smaller endpoint, a smaller quartile, a median, a greater quartile, and a greater endpoint, except otherwise specified.

Structure of Transformer Device

Figure 1:
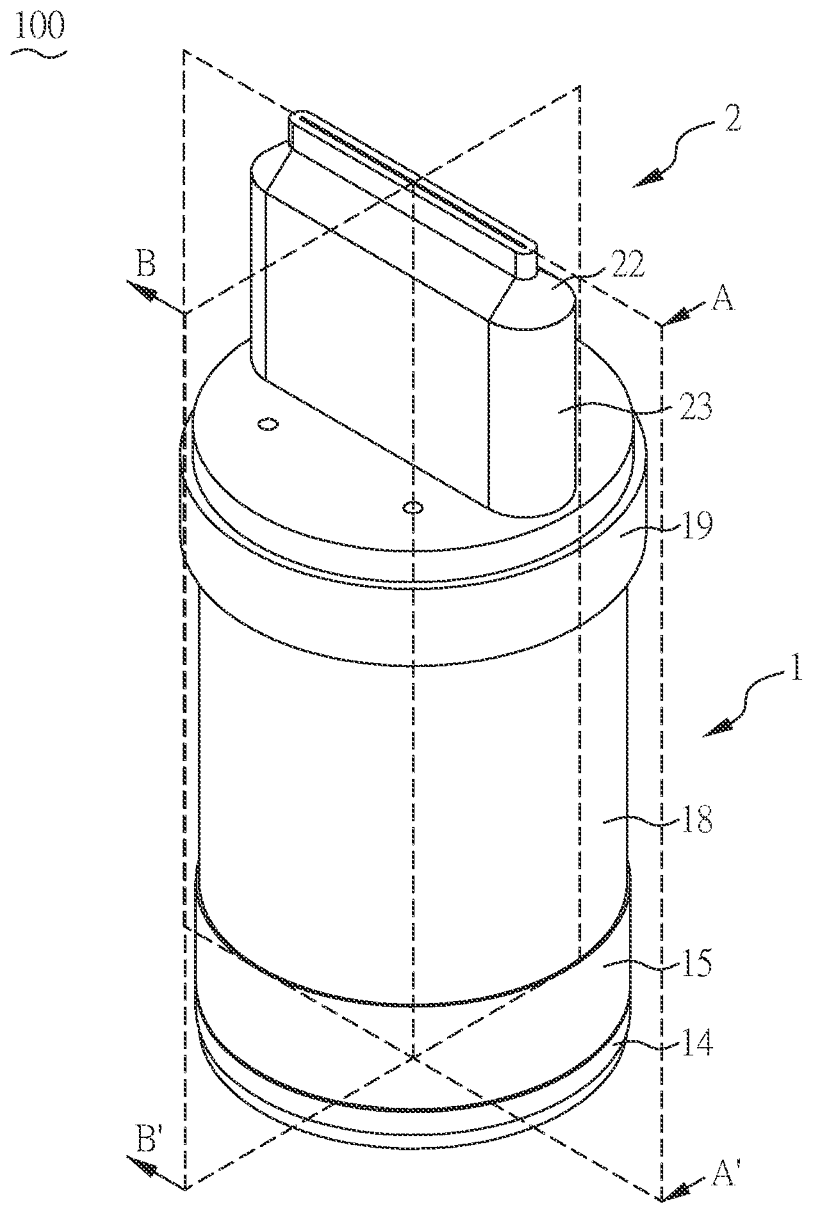
FIG. 1 is a schematic view of a plasma generating apparatus (comprising the transformer device and the plasma generating device) according to one embodiment of the present invention.

FIG. 1 is a schematic view of a plasma generating apparatus according to one embodiment of the present invention, and a part of a second electrode is omitted in FIG. 1.

Figure 2:
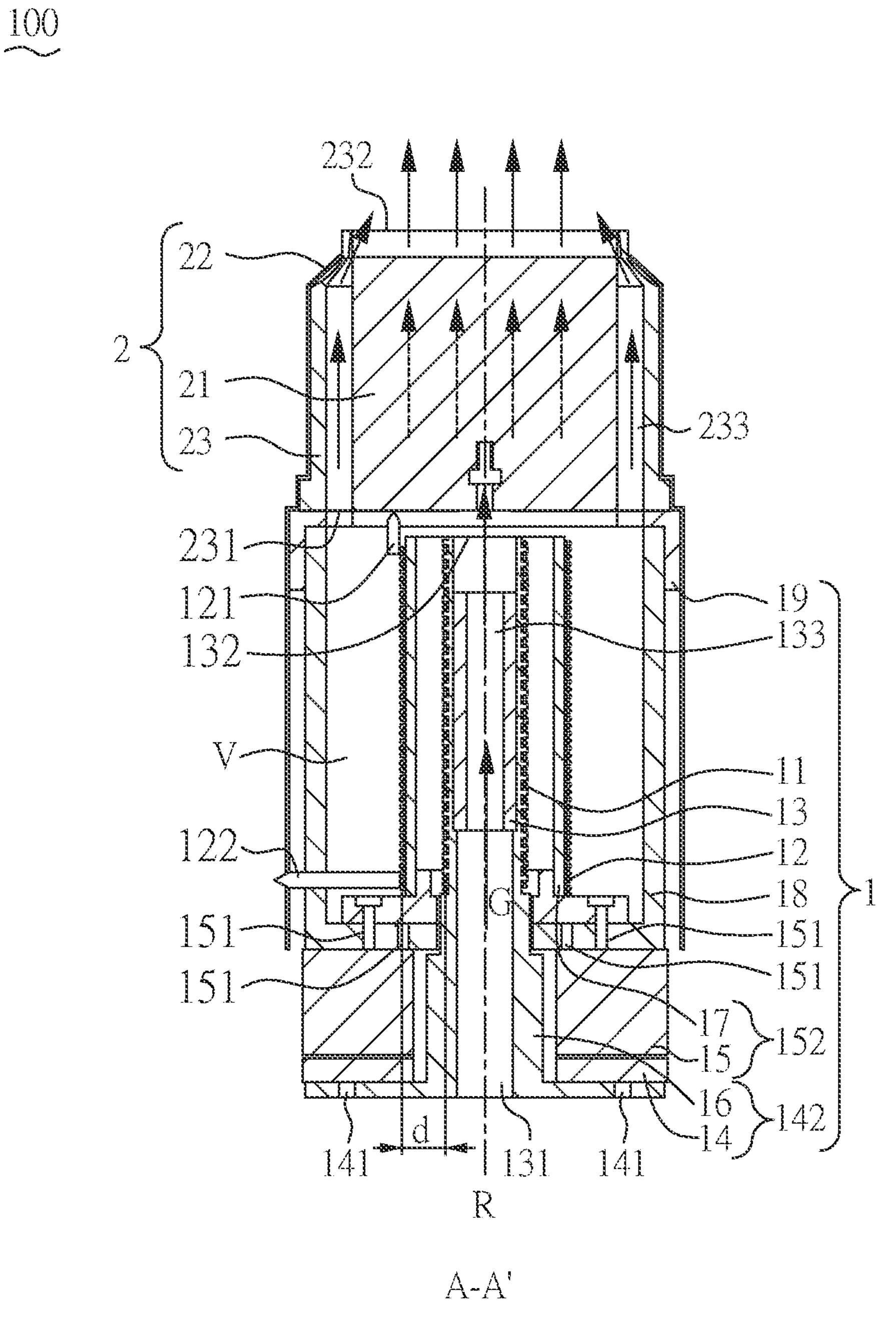
FIG. 2 is a cross-sectional view along the line A-A' in FIG. 1.

FIG. 2 is a cross-sectional view along the line A-A' in FIG. 1.

Figure 3:
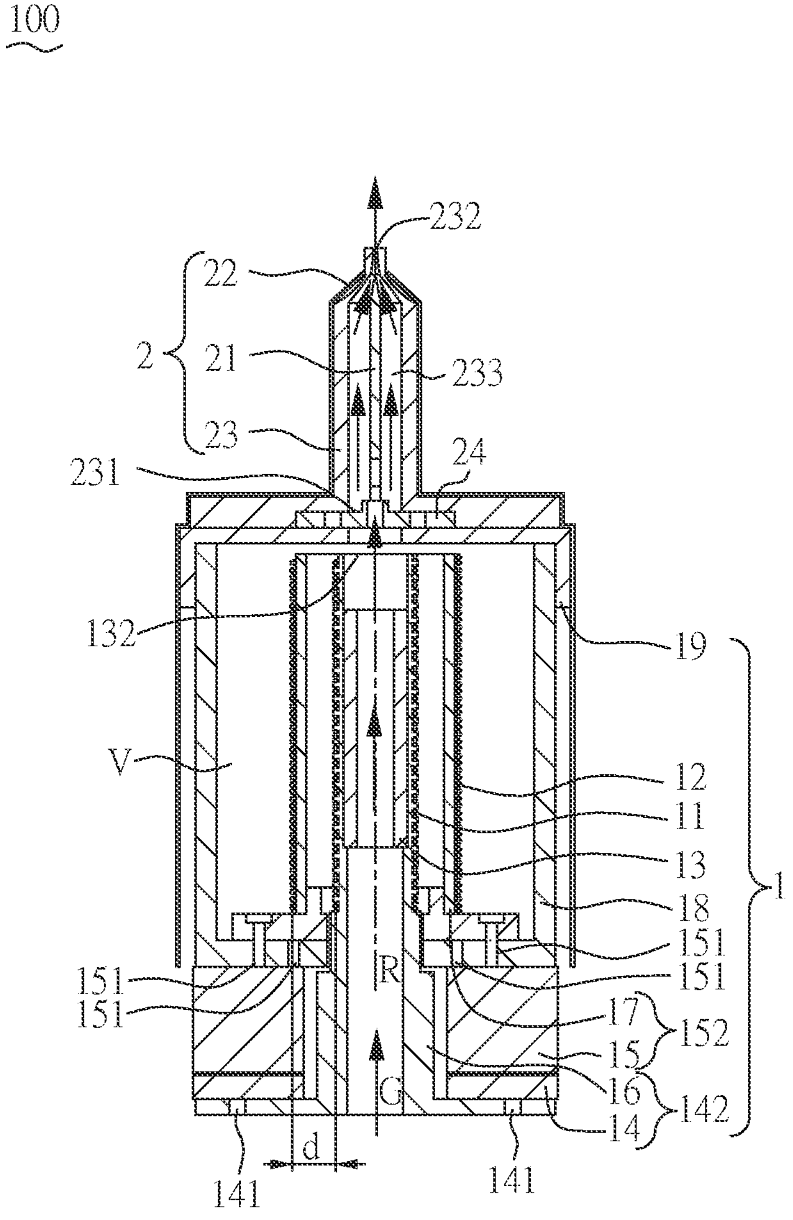
FIG. 3 is a cross-sectional view along the line B-B' in FIG. 1.

FIG. 3 is a cross-sectional view along the line B-B' in FIG. 1.

As shown in FIG. 1 to FIG. 3, the transformer device 1 of the present embodiment comprises: a first induction coil 11, a second induction coil 12, a magnetic element 13, a fixing element 142, a rotating element 152, a case 18 and a cover 19. The cover 19 is assembled on the case 18 to form a space V, the first induction coil 11, the second induction coil 12, the magnetic element 13, the fixing element 142 and the rotating element 152 are disposed in the space V. In addition, the fixing element 142 comprises a first winding base 16 and a motor stator 14, the first induction coil 11 is wound on the first winding base 16, and the magnetic element 13 is assembled on the first winding base 16; the rotating element 152 comprises a second winding base 17 and a motor rotor 15, the second induction coil 12 is wound on the second winding base 17, and the second winding base 17 is corresponding to the first induction coil 11, that is the second winding base 17 is corresponding to the first winding base 16. In other words, the second winding base 17 and the first winding base 16 have the same axis but no physical contact and are isolated from each other.

In the present embodiment, the amount of turns of the first induction coil 11 is less than the amount of turns of the second induction coil 12. In one embodiment of the present invention, the amount of turns of the first induction coil 11 is 24, and the amount of turns of the second induction coil 12 is 400. Herein, the drawings in the present specification are for illustration only, and the actual numbers of turns of first induction coil 11 and second induction coil 12 are not shown. The materials of the first induction coil 11 and the second induction coil 12 may respectively be Cu, and a distance d of the gap between the first induction coil 11 and the second induction coil 12 is 0.7 cm. In addition, the inside diameter of the first winding base 16 is about 1.2 cm, the outer diameter of the first winding base 16 is about 1.8 cm, the inside diameter of the second winding base 17 is about 2.6 cm, and the outer diameter of the second winding base 17 is about 3 cm. However, the present invention is not limited thereto, and the above configurations can be adjusted according to actual needs or effect.

The magnetic element 13 of the transformer device 1 has a first channel 133, the first channel 133 has a first inlet 131 and a first outlet 132, and the shape of magnetic element 13 is hollow cylindrical and made of iron oxide. Herein, the inside diameter of the magnetic element 13 is about 0.7 cm, and the outside diameter of the magnetic element 13 is about 1.2 cm. The first winding base 16 connects to the motor stator 14 to form the fixing element 142, and the second winding base 17 connects to the motor rotor 15 to form the rotating element 152. Therefore, when the motor rotor 15 is running, the fixing element 142 does not rotate, but the rotating element 152 rotates around the central axis R. In addition, the magnetic element 13, the first induction coil 11 and the first winding base 16 are assembled on the motor stator 14 through a first locking element 141 (in one embodiment, a screw and/or a screw hole), and the second induction coil 12 and the second winding base 17 are assembled on the motor rotor 15 through a second locking element 151 (in one embodiment, a screw and/or a screw hole). Therefore, when the motor rotor 15 is running, the magnetic element 13, the first induction coil 11 and the first winding base 16 do not rotate, but the second induction coil 12 and the second winding base 17 do.

Structure of Plasma Generating Device

Figure 4:
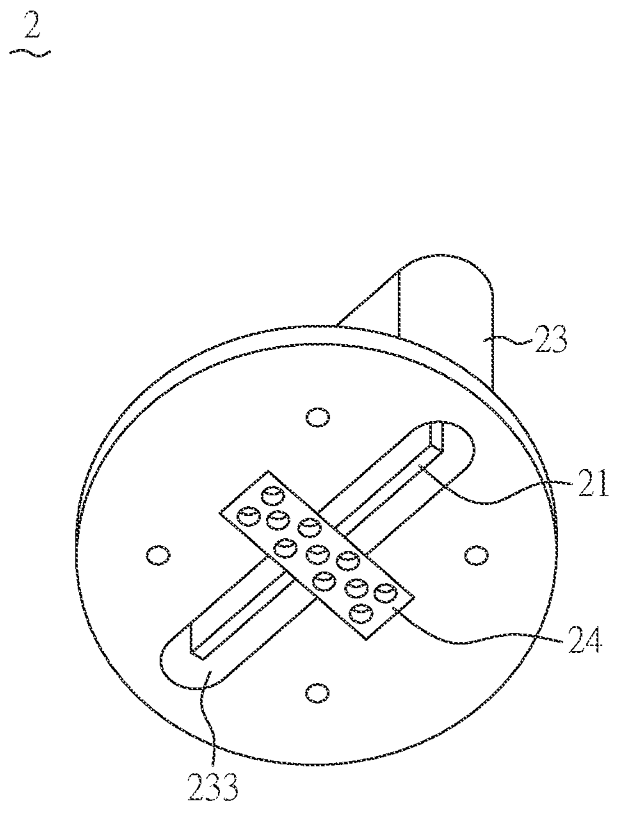
FIG. 4 is a schematic view of a plasma generating device according to one embodiment of the present invention.

FIG. 4 is a schematic view of a plasma generating device according to one embodiment of the present invention.

As shown in FIG. 4 together with FIG. 1 and FIG. 2, the plasma generating device 2 of the present embodiment comprises a first electrode 21, a second electrode 22, a dielectric element 23 and a third locking element 24, the dielectric element 23 is disposed between the first electrode 21 and the second electrode 22 (the second electrode 22 is a metal thin layer extending from the plasma generating device 2 downwards and electrically connecting to the second connector 122), and the first electrode 21 is assembled on the dielectric element 23 through the third locking element 24 (in one embodiment, a groove). In addition, the dielectric element 23 has a second channel 233, and the second channel 233 has a second inlet 231 and a second outlet 232.

In the present embodiment, the materials of the first electrode 21 and the second electrode 22 is Cu, the material of the dielectric element 23 is Teflon, the second outlet 232 has a strip shape, the length of the second outlet 232 is about 5 cm, and the width of the second outlet 232 is about 0.5 cm. However, the present invention is not limited thereto, and the above configurations can be adjusted according to actual needs or effect.

Structure of Plasma Generating Apparatus

Figure 5:
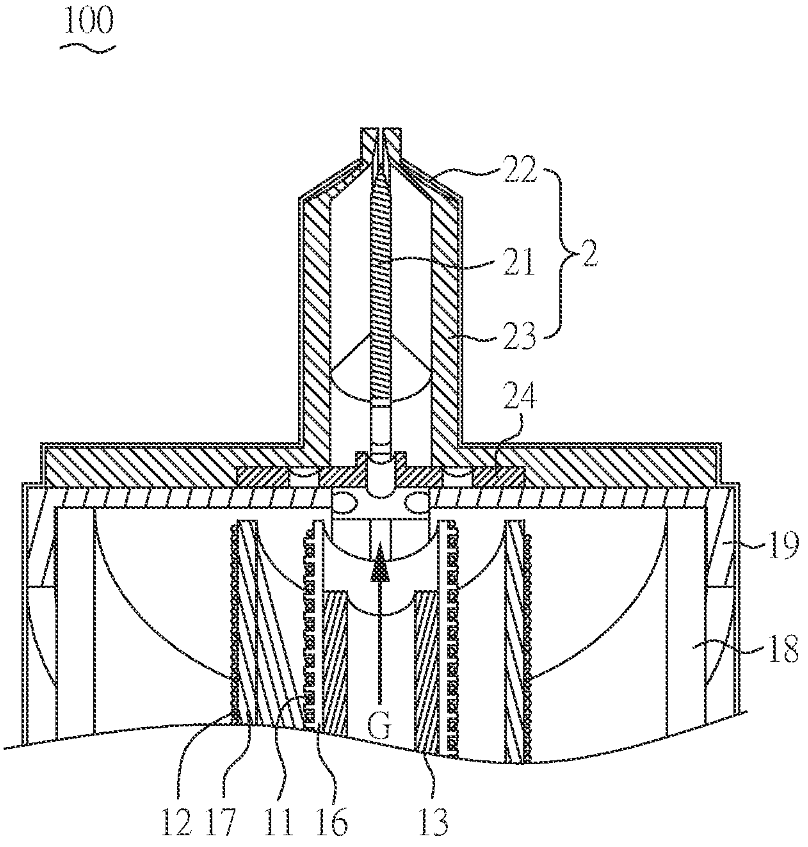
FIG. 5 is a cross-sectional view of a plasma generating apparatus according to one embodiment of the present invention.

FIG. 5 is a cross-sectional view of a plasma generating apparatus according to one embodiment of the present invention.

Figure 6:
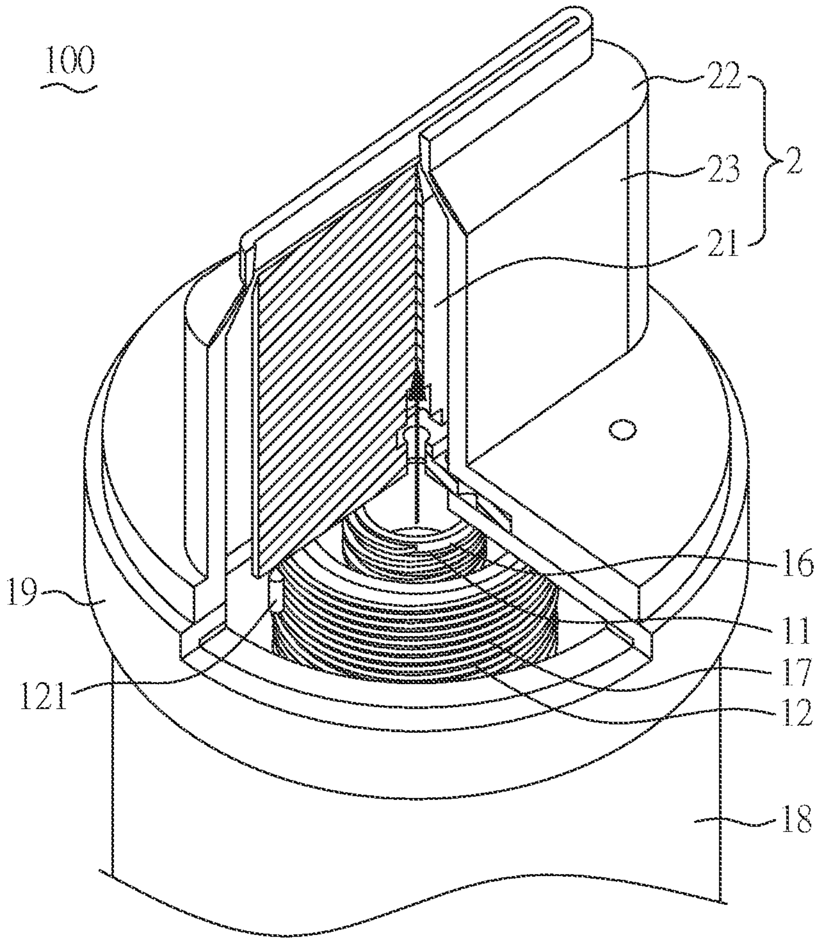
FIG. 6 is a schematic view of a plasma generating apparatus according to one embodiment of the present invention.

FIG. 6 is a schematic view of a plasma generating apparatus according to one embodiment of the present invention, and a part of the second electrode is omitted in FIG. 6.

As shown in FIG. 1 to FIG. 6, the plasma generating apparatus 100 of the present embodiment comprise the aforesaid transformer device 1 and the aforesaid plasma generating device 2. The plasma generating device 2 connects to the transformer device 1, and the second induction coil 12 is electrically connected to the first electrode 21 and the second electrode 22 of the plasma generating device 2 through the first connector 121 and the second connector 122 respectively. The first channel 133 corresponds to the second channel 233, that is, the first outlet 132 of the first channel 133 corresponds to and is connected to the second inlet 231 of the second channel 233. Thus, the gas G may be introduced from the first inlet 131 and large-area plasma can be generated at the second outlet 232.

That is to say, in the transformer device 1 of the present invention, the first induction coil 11 is wound on the hollow cylindrical first winding base 16, the magnetic element 13 is installed on the first winding base 16, the first winding base 16 is fixed on the motor stator 14 through the first locking element 141, and the hollow cylindrical magnetic element 13 will not affect the gas flowing through the first channel 133. The second induction coil 12 of the transformer device 1 is not fixed on the magnetic element 13, and is wound on the hollow cylindrical second winding base 17. The second winding base 17 is corresponding to the magnetic element 13, and there is no physical contact between the second winding base 17 and the magnetic element 13. The second winding base 17 and the plasma generating device 2 are installed on the motor rotor 15 of the motor. When the motor is running, the rotating element 152 and the plasma generating device 2 rotate, the plasma generating device 2 of the present invention, the second winding base 17 wound with the second induction coil 12, the case 18 and the cover 19 also rotate. The rotating second induction coil 12 can couple the electric energy transmitted from the first induction coil 11 to increase the voltage, and the high-voltage energy is transmitted to the first electrode 21 and the second electrode 22 of the plasma generating device 2 through the first connector 121 and the second connector 122 respectively to form a high-voltage electric field. Thereby, the gas G flowing through the first electrode 21 and the second electrode 22 is dissociated into a plasma state. In addition, due to the rotation of the plasma generating device 100, large area plasma can be formed at the second outlet 232 of the dielectric element 23. The plasma area can be 19.635 $cm^2$, which can be calculated by the following equation 2.

$$\left(\frac{\text{Length of the second outlet}}{2}\right)^2 \times \pi \qquad \text{Equation 2}$$

In conclusion, the present invention can provide a smooth hollow flow channel for gas to pass through, and the rotation speed of the plasma generating device will not be limited by the traditional conductive slip ring, so that the ejected plasma beam can be evenly distributed on the rotating cover area. In addition, since there is no need to use conductive slip rings, the weight of the plasma generating apparatus can be further reduced. On the other hand, since there is no physical contact between the plasma power supply and the first and second electrodes of the plasma generating device during rotation, the rotation speed can be much higher than that of conventional devices using mechanical rotating contacts. Thus, the losses caused by rotational friction can be reduced, the service life of the apparatus can be increased, the assembly of plasma generating apparatus can be simplified and the costs thereof can be reduced.

Although the present disclosure has been explained in relation to its embodiment, it is to be understood that many other possible modifications and variations can be made without departing from the spirit and scope of the disclosure as hereinafter claimed.

The invention claimed is:

1. A transformer device, comprising:

a magnetic element;

a first induction coil assembled on the magnetic element;

a second induction coil corresponding to the first induction coil, wherein the second induction coil and the first induction coil have the same axis but have no physical contact;

a fixing element comprising a first winding base and a motor stator, wherein the magnetic element and the first induction coil are assembled on the first winding base and combined with the motor stator with a first locking element; and a rotating element comprising a second winding base and a motor rotor, wherein the second induction coil is assembled on the second winding base and combined with the motor rotor with a second locking element.

2. The transformer device of claim 1, wherein an amount of turns of the first induction coil is less than an amount of turns of the second induction coil.

3. The transformer device of claim 1, wherein materials of the first induction coil and the second induction coil are respectively Cu, Ag, Al, an alloy thereof or a combination thereof.

4. The transformer device of claim 1, wherein a gap between the first induction coil and the second induction coil has a distance which ranges from 0.5 cm to 5 cm.

5. The transformer device of claim 1, wherein the rotating element connects to a motor, and the rotating element rotates around a central axis.

6. A plasma generating apparatus, comprising:

the transformer device of claim 1; and a plasma generating device connecting the transformer device and comprising a first electrode, a second electrode and a dielectric element, wherein the dielectric element is disposed between the first electrode and the second electrode.

7. The plasma generating apparatus of claim 6, wherein the second induction coil is electrically connected to the first electrode and the second electrode of the plasma generating device.

8. The plasma generating apparatus of claim 6, wherein the magnetic element has a first channel, the dielectric element has a second channel, and the first channel corresponds to the second channel.

9. The plasma generating apparatus of claim 8, wherein the first channel has a first inlet, the second channel has a second outlet, and a gas is introduced from the first inlet and plasma is generated at the second outlet.

10. The plasma generating apparatus of claim 9, wherein a length of the second outlet ranges from 2 cm to 15 cm.

* * * * *